United States Patent
Litvin

(10) Patent No.: US 8,391,723 B2
(45) Date of Patent: Mar. 5, 2013

(54) RAMEN BACKPUMPED NEAR-ZERO DISPERSION CWDM SYSTEM AND METHOD

(75) Inventor: Kerry I. Litvin, Huntingdon Valley, PA (US)

(73) Assignee: General Instrument Corporation, Horsham, PA (US)

(*) Notice: Subject to any disclaimer, the term of this patent is extended or adjusted under 35 U.S.C. 154(b) by 537 days.

(21) Appl. No.: 12/482,629

(22) Filed: Jun. 11, 2009

(65) Prior Publication Data

US 2010/0316382 A1 Dec. 16, 2010

(51) Int. Cl.
*H04B 10/18* (2006.01)
(52) U.S. Cl. .................................. 398/157; 398/160
(58) Field of Classification Search .............. 398/157, 398/160
See application file for complete search history.

(56) References Cited

U.S. PATENT DOCUMENTS 6,915,076 B1* 7/2005 Mittal et al. ............... 398/38
2008/0145055 A1* 6/2008 Perrier et al. ............... 398/92

* cited by examiner

*Primary Examiner* — Danny Leung
(74) *Attorney, Agent, or Firm* — Thomas A. Ward

(57) ABSTRACT

A system includes an optical transmitter portion, an optical fiber, an optical receiver portion, a laser portion and a combiner portion. Optical signals may be launched by the optical transmitter portion at very low power levels to avoid Raman-induced interactions between the co-propagating signals along the optical fiber. The laser portion and the combiner portion may apply a back-pumped laser signal to the optical fiber. The back-pumped laser signal provides a Raman gain that amplifies the co-propagating signals to a minimum power level such that the optical receiver portion can detect the co-propagating signals within a predetermined acceptable carrier-to-noise ratio.

11 Claims, 5 Drawing Sheets

RAMEN BACKPUMPED NEAR-ZERO DISPERSION CWDM SYSTEM AND METHOD

BACKGROUND

MSO (multi-service operators) provide several services to end users through a fiber optic network, with the final connection to the user through a coaxial connection. The services provided by the MSO typically include broadcast analog video, and narrow cast digital services such as data, VoIP, subscription pay per view, and video on demand (VOD) services. The services are allocated to a portion of the approximately available 1 GHz RF transmission spectrum on each optical channel in the network.

In recent years wavelength division multiplexed (WDM) optical transmission systems have been increasingly deployed in optical networks to meet the increased demand for bandwidth by providing more than one optical channel over the same optical fiber. The WDM techniques include coarse wavelength division multiplexed (CWDM) and dense wavelength division multiplexed (DWDM) systems. Whether a system is considered to be CWDM or DWDM simply depends upon the optical frequency spacing of the channels utilized in the system.

FIG. 1 shows a simplified block diagram of a conventional WDM transmission arrangement 100, which includes a radio frequency (RF) splitter 102, lasers $104_1$, $104_2$, $104_3$ and $104_4$, a wavelength division multiplexer (WDM) 106 and a single optical transmission path 108. As illustrated in the figure, a broadcast signal is split by RF splitter 102 into a plurality of information-bearing signals $S_1$, $S_2$, $S_3$ and $S_4$, each of which are a copy of the broadcast signal and hence contain the same information. The information-bearing signals are applied to and modulated on lasers $104_1$, $104_2$, $104_3$ and $104_4$, respectively. Narrowcast signals containing other information, such as digital data, video on demand data, and VoIP data are also provided to and modulated on lasers $104_1$, $104_2$, $104_3$, and $104_4$. Lasers $104_1$, $104_2$, $104_3$ and $104_4$ generate data modulated optical channels at wavelengths $\lambda_1$, $\lambda_2$, $\lambda_3$ and $\lambda_4$, respectively, where $\lambda_4 > \lambda_3 > \lambda_2 > \lambda_1$. WDM 106 receives the optical channels and combines them to form a WDM optical signal that is then forwarded onto single optical transmission path 108.

As illustrated in the figure, narrowcast signals may be RF frequency multiplexed with broadcast channels. The narrowcast signals are typically digital signals and are normally much lower in amplitude than broadcast video signals. The arrangement of sending the same broadcast signal and different narrowcast signals over multiple wavelengths is a means of providing more segmentation in an optical network. RF splitter 102 splits the broadcast signal among lasers $104_1$, $104_2$, $104_3$ and $104_4$. As shown, each of lasers $104_1$, $104_2$, $104_3$ and $104_4$ receives a different narrowcast signal. The wavelengths carrying the combined broadcast and individual narrow cast signals, $\lambda_1$, $\lambda_2$, $\lambda_3$ and $\lambda_4$, respectively, are optically multiplexed onto single optical transmission path 108.

Conventional transmission lasers are capable of providing more than sufficient launch power to transmit a signal from end to end of a metropolitan distribution system, where the fiber link lengths are on the order of 15-30 kilometers. However, when multiple optical signals are provided on the same fiber, Raman cross-talk is induced. This Raman cross-talk creates distortion in the received signals. This will be discussed in more detail below.

Although WDM optical transmission systems have increased the speed and capacity of optical networks, the performance of such systems is limited by various factors such as chromatic dispersion and the fiber nonlinearity, which can cause pulse shape change in the case of baseband digital signals and distortions in the case of analog signals. These impairments degrade the quality of the optically transmitted information. Fiber nonlinearities, for example, can give rise to crosstalk between optical signals operating at different wavelengths. When crosstalk occurs, modulation components of one signal are superimposed on another signal at a different wavelength. If the level of crosstalk is sufficiently large it will corrupt the information being transmitted by the optical signals impacted by this impairment.

One common cause of crosstalk, in an optical fiber communication system with multiple wavelengths, is Raman scattering. This type of crosstalk is caused by stimulated Raman scattering (SRS) in silica fibers (and other materials) when a pump wave co-propagates with a signal wave through it. Stimulated Raman scattering is an inelastic scattering process in which an incident pump photon loses its energy to create another photon of reduced energy at a lower frequency. The remaining energy is absorbed by the fiber medium in the form of molecular vibrations (i.e., optical phonons).

FIG. 2 is a schematic diagram of the stimulated Raman scattering process. In the figure, a Raman media 202 has a transmission side 204 and a reception side 206. Signal photon 208, signal photon 210, pump photon 212, pump photon 214 and pump photon 216 travel from transmission side 204, through Raman media 202 toward reception side 206. At point 218, pump photon 212 is scattered in Raman media 202. As a result of the scattering event, pump photon 212 is annihilated and a new signal photon 220 at the Stokes frequency is created along with an optical phonon 222 at the Stokes shift frequency. Both energy and momentum are conserved:

$$\hbar \omega_{pump} = \hbar \omega_{signal} + \hbar \omega_{Op\,phonon} \text{ and } \hbar \vec{k}_{pump} = \hbar \vec{k}_{signal} + \hbar \vec{k}_{Op\,phonon},$$

where $\omega_x$ is the frequency of x and $k_x$ is the associated wavevector of x and $\hbar$ is Planck's constant divided by $2\pi$.

FIGS. 3A-3C illustrate how the transfer of energy from Raman gain gives rise to crosstalk. FIGS. 3A-3C are simplified illustrations that are useful in facilitating an understanding of Raman crosstalk between two optical channels or signals $S_i$ and $S_j$, where $S_j$ is at a longer wavelength than $S_i$. FIG. 3A shows the signal $S_i$ and FIG. 3B shows the signal $S_j$. For simplicity of illustration $S_j$ is shown as a signal with constant amplitude (i.e., a continuous string of zeros or ones in the case of baseband digital modulation). As indicated in FIG. 3C, the pattern of signal $S_i$ (dashed line) is impressed on the signal $S_j$ by the process of Raman scattering interactions. In other words, signal $S_j$ now includes as one of its components the pattern of signal $S_i$. Likewise, since signal $S_i$ is pumping the signal $S_j$, the pattern of signal $S_j$ (had it been modulated) would be impressed upon the pump $S_i$ by the process of pump depletion.

In addition to the generation of unwanted crosstalk the SRS process can also lead to the generation of Raman-induced second order (CSO: composite second order) and third order (CTB: composite triple beat) distortions. These distortions occur as result of the nonlinear nature of the Raman amplification process which, in the undepleted regime, is exponential in form.

Further, the Raman-induced crosstalk and nonlinear distortions are more pronounced when the wavelengths are located near the zero (i.e., near-zero) dispersion wavelength of the optical transmission media through which the signals are co-propagating (i.e., the optical fiber). In the case of a near-zero dispersion system the optical pump and signal waves are propagating at nearly identical group velocities through the media. The zero dispersion wavelength of a transmission media refers to the wavelength at which an optical signal will have no change in (inverse) group velocity with respect to changes in its optical frequency. The zero dispersion wavelength differs for different transmission media. In this case, the relative positions of the waves with respect to one another will remain nearly fixed throughout the length of the transmission media. Thus, if the signals $S_i$ and $S_j$ are at or near the zero dispersion wavelength, they will largely maintain their relative phase with respect to one another. Hence, with very little walk off occurring between the optical channels the Raman-induced crosstalk and distortions can build up along the fiber in a constructive manner. The dispersion will generally increase as the wavelength difference between the optical signal and the zero dispersion wavelength increases. If the signals $S_i$ and $S_j$ are located at wavelengths far displaced from the zero dispersion wavelength, their relative phases will change as they propagate down the transmission path. The levels of Raman-induced crosstalk and distortions are much lower in the nonzero dispersion scenario because, as the signals walk away from one another, it becomes more difficult for the crosstalk and distortions to build up constructively along the fiber length.

With reference again to FIG. 1, Raman-induced crosstalk may occur among the optical channels $\lambda_1$, $\lambda_2$, $\lambda_3$ and $\lambda_4$. Raman interactions cause both crosstalk interference and signal distortions on each optical channel. Because the amplitude of broadcast video signals is much higher than that of narrowcast digital signal, Raman-induced crosstalk has more impact on analog video signals between optical channels than on narrowcast channels.

Broadband communication system operators are currently seeking an inexpensive and efficient method to distribute directed programming (digital narrow cast) along with the analog broadcast programming to their customer base. One proposed method to accomplish this "fiber deep" application is through the use of a course wavelength division multiplexed (CWDM) optical system using wavelengths around 1310 nm.

Several serious obstacles exist and must be overcome before a workable 1310 CWDM system could actually be put into service. These problems arise as a result of the characteristics of the typical single mode fiber that is commonly deployed in the field and the required modulation scheme for the fiber deep architecture, which jointly render the proposed 1310 nm CWDM system useless.

The very small walk-off near 1310 nm coupled with the larger Raman gain factors means that the co-propagating optical signals will be more likely to interact with one another resulting in generally higher noise levels and distortion on the signals due to Raman interactions.

Additionally, in the fiber deep system each laser is modulated with identical analog broadcast information. This in conjunction with the enhanced probability of Raman interactions in the fiber produces new CSO and CTB distortions, which destroy the quality of the analog broadcast channels.

The deleterious effects of the Raman interaction between the co-propagating optical signals can be completely eliminated by simply reducing the launch powers of the CWDM laser transmitters. Unfortunately, reducing the launch powers means that the received signals, at the far end of the fiber, will have an unacceptably small carrier to noise ratios (CNR). The TV picture quality would again suffer.

FIG. 4A illustrates a conventional communication system 400 having an optical transmitter 402, a length of optical fiber 404 and an optical receiver 406. Optical fiber 404 is disposed between optical transmitter 402 at a transmitter side 408 and optical receiver 406 at a receiver side 410.

FIG. 4B is a graphical representation of light transmission through optical fiber 404. In the figure, the y-axis conveys the amount of power transmitted by each of the co-propagating signals and the x-axis conveys a distance from transmitter side 408 to receiver side 410. Solid line 412 represents no signal being transmitted by transmitter 402. Solid line 414 represents the maximum signal power that transmitter 402 can provide. Dotted line 416 represents a transmission power limit, whereas dotted line 418 represents a reception power threshold.

As discussed above, the amplitude of each transmitted co-propagating signal that optical fiber 404 may transmit, wherein each corresponding received signal is within a predetermined acceptable CNR, is limited by Raman interactions. As indicated by solid line 414 in FIG. 4B, optical transmitter 402 may be capable of providing each co-propagating signal having power that is greater than the transmission power limit as indicated by dotted line 416. Nevertheless, co-propagating signals having power higher than the transmission power limit as indicated by dotted line 416 will have unacceptable CNR ratios when received by receiver 406. That is, such signals may not be sufficiently processed without an unacceptable amount of noise and/or errors.

Optical receiver 406 at receiver side 410 has a predetermined level of detection, wherein a received signal power must be above a predetermined threshold in order to detect the signal at a predetermined acceptable CNR. If a detected signal power is below the predetermined threshold, then the CNR will be unacceptable such that the signal will be too noisy to process. In FIG. 4B, this example a reception power threshold is indicated by dotted line 418.

Further, optical transmission characteristics that are inherent in the media of optical fiber 404 attenuate a transmitted signal as a function of length along the direction of propagation through optical fiber 404. Accordingly, each co-propagating transmitted signal at transmitter side 408 of optical fiber 404 having a transmission power at the transmission power limit indicated by dotted line 416 will attenuate as it propagates toward receiver side 410. In this example, the signal attenuation of one of the co-propagating signals is indicated by line 420. The slope of attenuation may vary in accordance with changes in material in optical fiber 404. Further, although in this example the attenuation in the transmitted signal is linear, in other examples, the attenuation may be non-linear.

In order for receiver 406 to detect a transmitted co-propagating signal, as discussed above, within the predetermined CNR, the received signal power must be no lower than the reception power threshold indicated by dotted line 418. Accordingly, with a predetermined: 1) transmission power at the transmission power limit indicated by dotted line 416; 2) signal attenuation as indicated by line 420, which is based on optical transmission characteristics that are inherent in the media of optical fiber 404; and 3) reception power threshold is indicated by dotted line 418, a maximum length $l_{max}$ of optical fiber 404 may be determined. This maximum length $l_{max}$ of optical fiber 404 is the maximum length of optical fiber 404 that may be disposed between optical transmitter 402 and optical receiver 406, such that the deleterious effects of the Raman interactions between co-propagating signals, which cause distortions and crosstalk, and the fiber attenuation leading to degraded CNR at the receiver are at acceptable levels so as to still maintain a suitable system performance.

In order to have an acceptable CNR value, in analog optical transmission system, the received optical power at the far end of the fiber must typically be 0 dBm (1 mw). In a 20 km link, for example, the fiber loss is about 7 dB. In a conventional system as discussed above with respect to FIGS. 4A and 4B, a CWDM laser launch power must then be 7 dBm (5 mw) so that 0 dBm arrives at the receiver. A 7 dBm launch power is high enough to induce the Raman-induced crosstalk and Raman CSO/CTB distortions. Therefore, a conventional system is unable to successfully transmit CWDM signals over a 20 km link.

It is desirable to have a system and method that may increase the conventional maximum length $l_{max}$ of optical fiber used in CWDM communication systems, while maintaining the convention transmission power of the transmission signal.

It is further desirable to have a system and method that may maintain the convention maximum length $l_{max}$ of optical fiber used in CWDM communication systems, while decreasing the conventional transmission power of the transmission signal.

BRIEF SUMMARY

The proposed invention eliminates the deleterious effects of Raman interactions by reducing the CWDM laser launch powers while also maintaining the desired CNR.

In accordance with an aspect of the present invention, a system is provided for transmitting a first optical signal and a second optical signal through an optical fiber having material operable to transmit a wavelength band including a first wavelength and a second wavelength and that produces distortions when a transmission power is greater than a maximum acceptable transmission power such that an output has a degradation that is more than a predetermined acceptable degradation. The system may include a first and second optical transmitter, an optical receiver, a laser portion and a combiner. The first optical transmitter can transmit the first optical signal up to a first maximum power and including the maximum acceptable transmission power. The first optical signal has the first wavelength. The second optical transmitter can transmit the second optical signal up to a second maximum power and including the maximum acceptable transmission power. The second optical signal has the second wavelength. The optical receiver may be disposed to receive a received optical signal corresponding to one of the first optical signal and the second optical signal. The optical receiver can process the received optical signal only when the received optical signal has a power equal to or greater than a minimum power and when a degradation of the received optical signal is less than or equal to the predetermined acceptable degradation. The laser portion can generate an amplifying signal capable of generating a Raman interaction in the optical fiber to provide a gain to the received optical signal. The combiner portion can receive the amplifying signal and provide a back-pump signal based on the amplifying signal into the optical fiber to provide a gain to the one of the first optical signal and the second optical signal such that when the first optical transmitter transmits the first optical signal below the maximum acceptable transmission power and when the second optical transmitter transmits the second optical signal below the maximum acceptable transmission power, the optical receiver can process the received optical signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
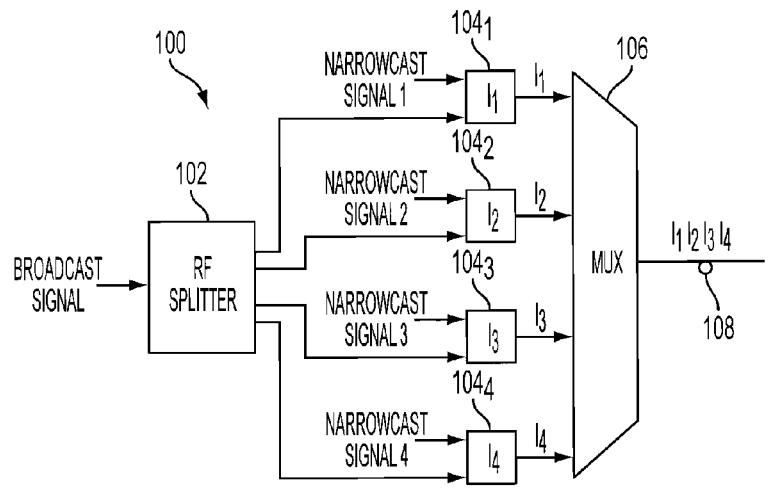
FIG. 1 shows a simplified block diagram of a conventional WDM transmission arrangement.
Figure 2:
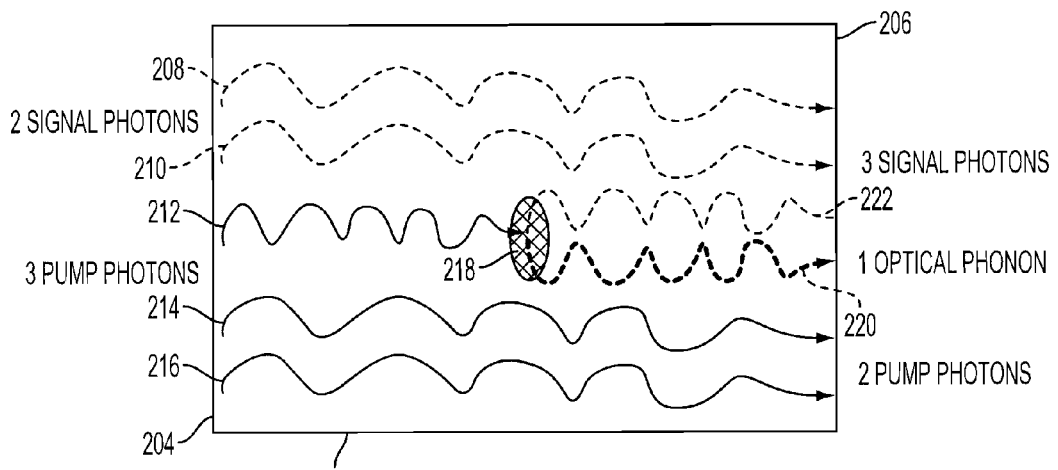
FIG. 2 is a schematic diagram of the stimulated Raman scattering process.
Figure 3A:
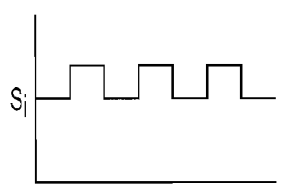
FIGS. 3A-3C illustrate how the transfer of energy from Raman gain gives rise to crosstalk.
Figure 3B:
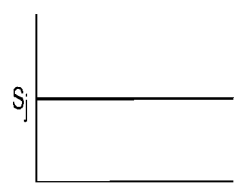
Figure 3C:

An aspect of the present invention is drawn to launching co-propagating signals at very low power levels and still receiving such co-propagating signals at long distances and at sufficient receiver power and by concurrently reducing distortion levels.

The present invention seeks to eliminate the deleterious nonlinear effects of Raman interactions by reducing the CWDM laser launch powers while also maintaining the desired CNR as if the optical signals were launched at their full powers. This is accomplished by taking advantage of the Raman interaction in the fiber and putting it to use in a positive manner. The Raman interaction is used to produce useful optical signal gain. By locating a high power unmodulated laser of the appropriate wavelength at the far end of the fiber (i.e., at the node) and launching this Raman pumping signal back towards the transmitter a back-pumped distributed Raman amplifier is created in the fiber. The gain of this amplifier can be used to offset the optical losses in the fiber.

In accordance with an aspect of the present invention, when the fiber acts as a Raman amplifier by back-pumping, much lower levels of launching powers are able to be transmitted. By doing this, the Raman-induced interactions between the co-propagating signals are reduced. As a result, the crosstalk levels are reduced and the CSO and CTB levels are reduced as compared to the case where the signals are launched at full power.

In other words, in accordance with an aspect of the present invention, by reducing the power level of the launch signals, the co-propagating signals can transmit over a distance on the order of 15-30 km, e.g., the distance of a metropolitan distribution system, and end up with a sufficient receiver power level while reducing Raman interactions between co-propagating signals and therefore reducing Raman-induced crosstalk, CSO and CTB. As such, a system in accordance with an aspect of the present invention overcomes a previous practical barrier to the deployment of CWDM systems that are operating near the zero-dispersion point.

In accordance with aspects of the present invention, a CWDM laser launch power may be lower than 7 dBm (5 mw), wherein 0 dBm arrives at the receiver even over a 20 km link. If the fiber were back-pumped with enough power to create 7 dB of gain, the fiber losses would be exactly offset. In this case, the CWDM lasers could then each be launched at 0 dBm (1 mw) a power level sufficiently low enough so that the deleterious Raman interactions are squelched. The 7 dB distributed Raman gain ensures that the signals arrive at the receiver at the desired 0 dBm power level and the CNR is maintained as if the signals were launched at the full power, and no significant Raman interactions are induced.

The idea is to simply place an appropriate Raman pumping laser(s) at the node along with the associated coupling optics. At the CWDM transmitter site pump signal decoupling optics would be included to remove any unused pump energy from the system.

Figure 4A:
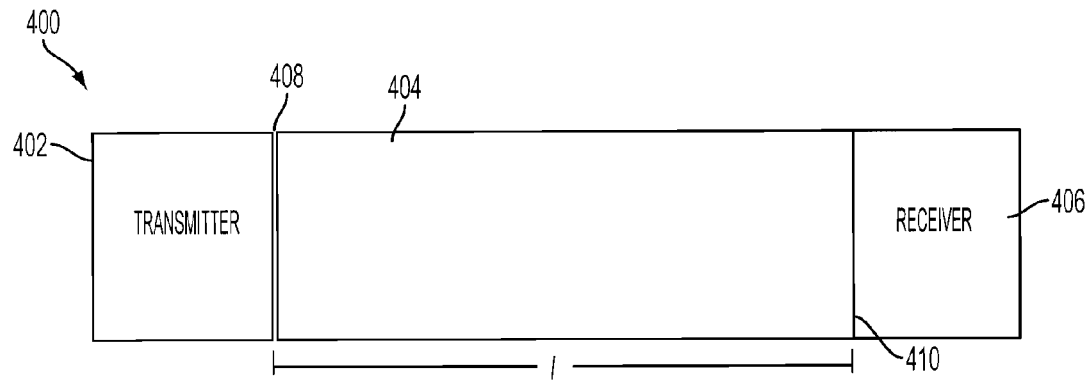
FIG. 4A illustrates a conventional communication system.
Figure 5A:
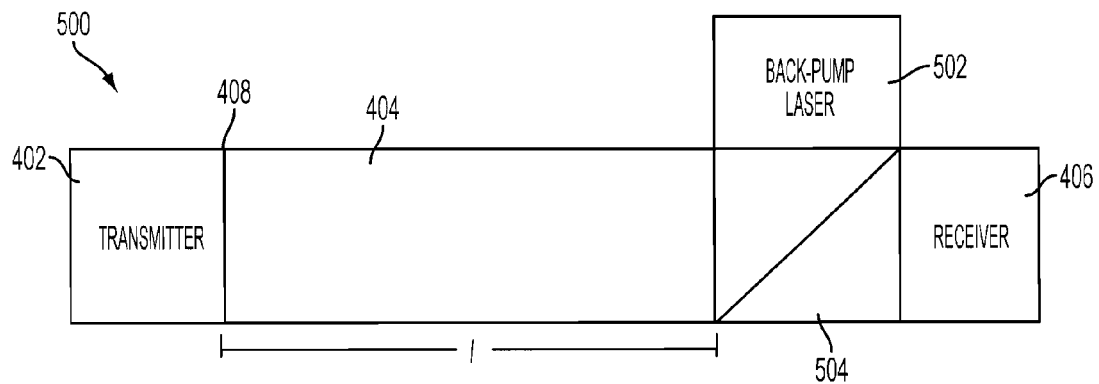
FIG. 5A illustrates an example communication system in accordance with an aspect of the present invention.

FIG. 5A illustrates an example communication system 500 in accordance with an aspect of the present invention. As illustrated in the figure, communication system 500 is similar to communication system 400 of FIG. 4A, but further includes a laser 502 and a combiner 504. Laser 502 is an unmodulated laser of appropriate wavelength and is disposed at receiver side 410 of optical fiber 404. Laser 502 is operable to launching a Raman pumping signal back towards transmitter 402, thus creating a back-pumped distributed Raman amplifier in optical fiber 404. The gain of this back-pumped distributed Raman amplifier can be used to offset the optical losses in the fiber.

As discussed above, optical transmission characteristics that are inherent in the media of optical fiber 404 attenuate a transmitted signal as a function of length along the direction of propagation through optical fiber 404. In accordance with an aspect of the present invention, the gain of this back-pumped distributed Raman amplifier generated from laser 502 offsets the attenuation in optical fiber 404. When optical fiber 404 acts as a Raman amplifier via back-pumping from laser 502, much lower level launch powers can be utilized by transmitter 402. Further, such back-pumping amplification of co-propagating signs reduces Raman-induced interactions between the co-propagating signals along optical fiber 404. As a result, the received co-propagating signals are amplified to a sufficient reception threshold, while the crosstalk levels and the CSO and CTB levels are reduced as compared to the case where the signals are launched at full power. Therefore, the resultant signal attenuation and distributed amplification of each co-propagating signal in accordance with an aspect of the present invention is indicated by curve 506.

Figure 5B:
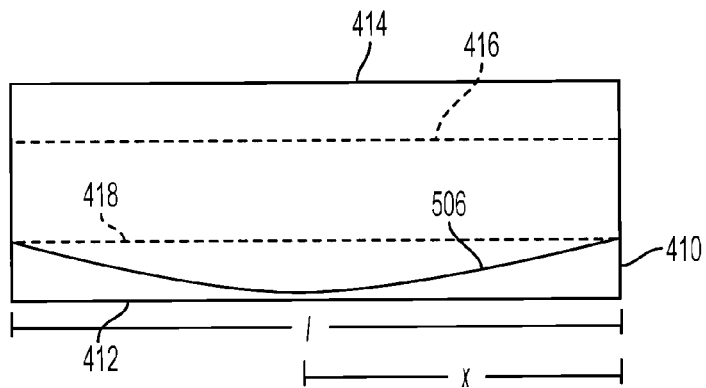
FIG. 5B is a graphical representation of light transmission through an optical fiber in the communication system of FIG. 5A.

FIG. 5B is a graphical representation of light transmission through optical fiber 404 of communication system 500 of FIG. 5A. In FIG. 5B, the y-axis conveys the amount of power transmitted by each of the co-propagating signals and the x-axis conveys a distance from transmitter side 408 to receiver side 410.

In the example discussed above with respect to FIG. 5A, transmitter 402 is operable to transmit a plurality of co-propagating signals, each having a power level at the reception power threshold indicted by dotted line 418. In this example, each transmitted co-propagating signal attenuates within optical fiber 404, wherein such a loss results in the power being below the reception power threshold indicated by dotted line 418, as a result of optical transmission characteristics that are inherent in the media of optical fiber 402. However, at a distance x from receiver side 410, the gain due to the back-pumped distributed Raman amplification from laser 502 counters such attenuation. As each co-propagating signal approaches receiver side 410, the gain due to the back-pumped distributed Raman amplification from laser 502 begins to overtake the attenuation due as a result of optical transmission characteristics that are inherent in the media of optical fiber 402. Eventually, at receiver side 410 the gain due to the back-pumped distributed Raman amplification from laser 502 has increased each co-propagating signal to the reception power threshold indicated by dotted line 418.

As illustrated in FIG. 5B, the reception power threshold indicated by dotted line 418 is much lower than the transmission power limit indicated by dotted line 416. Therefore, it is clear that the embodiment of FIG. 5A enables successful transmission of co-propagating signals from transmitter 402, through optical fiber 404 and to receiver 406 with much lower transmission power, as compared to the conventional system discussed above with reference to FIG. 4A.

As mentioned above, the gain due to the back-pumped distributed Raman amplification from laser 502 is a function of the power of the back-pumped signal. As such, by modifying the power of the back-pumped signal, the attenuation function of each co-propagating signal transmitted from transmitter 402 to receiver 406 may be modified. An example of such a modification will now be described with reference to FIGS. 6A and 6B.

Figure 6A:
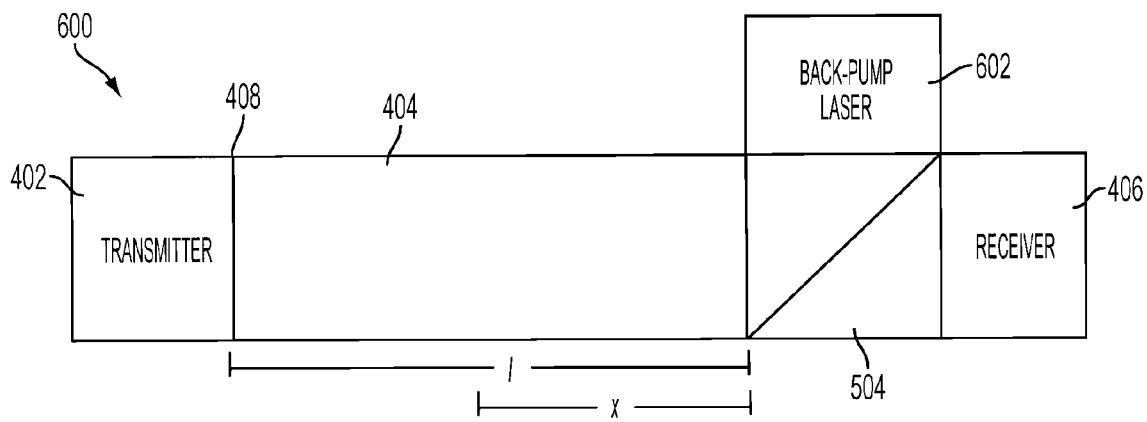
FIG. 6A illustrates another example communication system in accordance with an aspect of the present invention.
Figure 6B:
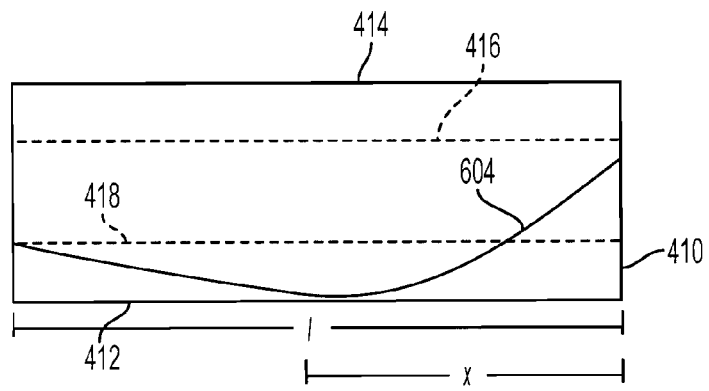
FIG. 6B is a graphical representation of light transmission through an optical fiber in the communication system of FIG. 6A.

FIG. 6A illustrates communication system 600, wherein laser 602 provides a back-pumped signal that has higher power than laser 502 that is discussed above with reference to FIG. 5A. FIG. 6B is a graphical representation of light transmission through optical fiber 404 of communication system 600 of FIG. 6A. In FIG. 6B, the y-axis conveys the amount of power transmitted by each of the co-propagating signals and the x-axis conveys a distance from transmitter side 408 to receiver side 410.

In this example, transmitter 402 is operable to transmit a plurality of co-propagating signals, each having a power level that is equal the reception power threshold indicated by dotted line 418. In this example, each of the transmitted co-propagating signals attenuates within optical fiber 404, wherein such a loss results in the power being below the reception power threshold indicated by dotted line 418, as a result of optical transmission characteristics that are inherent in the media of optical fiber 404. However, at a distance x from receiver side 410, the gain due to the back-pumped distributed Raman amplification from laser 602 counters such attenuation. As each co-propagating signal approaches receiver side 410, the gain due to the back-pumped distributed Raman amplification from laser 602 begins to overtake the attenuation due as a result of optical transmission characteristics that are inherent in the media of optical fiber 402. In this example, the power level of laser 602 is higher than the power level of laser 502 in the example discussed above with respect to FIG. 5A. As such, in this example, at receiver side 410 the gain due to the back-pumped distributed Raman amplification from laser 602 increases each co-propagating signal above the reception power threshold indicted by dotted line 418. The resultant attenuation and subsequent amplification of each co-propagating signal in accordance with an aspect of the present invention is indicated by curve 604.

It is clear that the increased power level of laser 602, increases the received power of each co-propagating signal.

Figure 7:
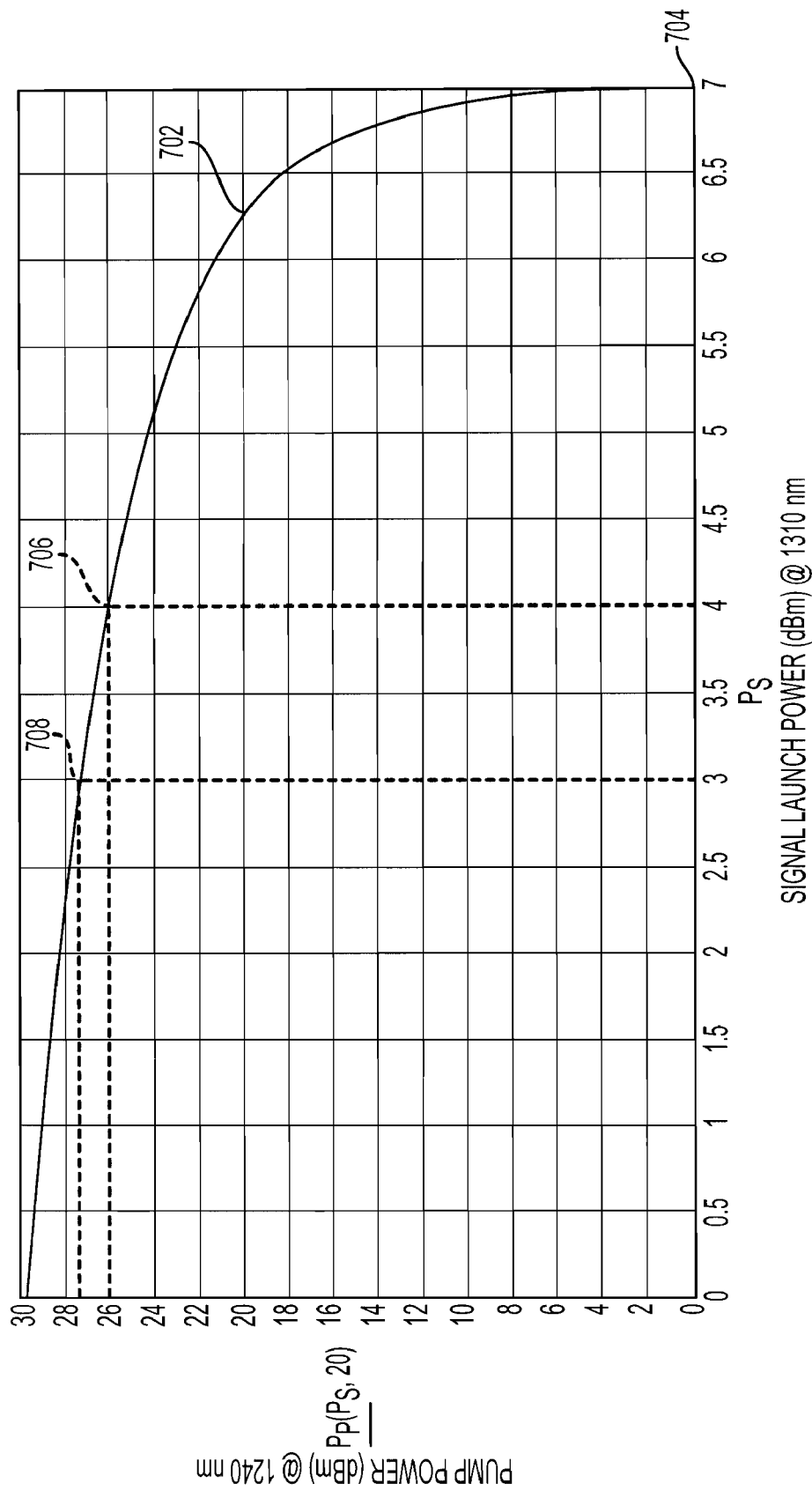
FIG. 7 is a graph showing the total required Raman pumping power at 1240 nm so that enough gain is produced in a fiber at 1310 nm for a given signal launch power to maintain 0 dBm at the receiver in a 20 km link.

FIG. 7 is a graph showing a signal launch power (dBm) as a function of back-pumped power (dBm). In the figure, the x-axis is launch power in dBm at a wavelength of 1310 nm, and the y-axis is the Raman back-pumping power (dBm) at a wavelength of 1240 nm. Function 702 illustrates the required Raman back-pumping power for a respective launch power to provide sufficient gain in a fiber to enable a receiver to receive an acceptable signal in a 20 km link. It is assumed in the calculation that the polarization overlap factor is ½. This then implicitly implies that two cross polarized pump lasers are utilized each of which has an optical power level that is 3 dB lower than the total power shown on the y-axis.

As illustrated at point 704 in function 702, when no Raman back-pumping power is used, the required launch power to provide sufficient gain in a fiber to enable a receiver to receive an acceptable signal in a 20 km link is 7 dBm.

However, as illustrated at point 706 in function 702, when 26 dBm of Raman back-pumping power is used, the required launch power to provide sufficient gain in a fiber to enable a receiver to receive an acceptable signal in a 20 km link is only 4 dBm. That is a 3 dBm decrease in the required signal launch power as compared to the case when no Raman back-pumping power is used. As a general rule, for every dBm decrease in the signal launch power, there is a corresponding double amount of dBm reduction in the CSO and Raman-induced crosstalk in the received signal. In this case, a 26 dBm of Raman back-pumping power enables a 3 dBm reduction in the required signal launch power, which therefore reduces the CSO and Raman-induced crosstalk powers in the received signal by 6 dBm.

Further, as illustrated at point 708 in function 702, 27.5 dBm of Raman back-pumping power is used, the required launch power to provide sufficient gain in a fiber to enable a receiver to receive an acceptable signal in a 20 km link is only 3 dBm. That is a 4 dBm decrease in the required signal launch power as compared to the case when no Raman back-pumping power is used. In this case, a 27.5 dBm of Raman back-pumping power enables a 4 dBm reduction in the required signal launch power, which therefore reduces the CSO and Raman-induced crosstalk in the received signal by 8 dBm.

Figure 8:
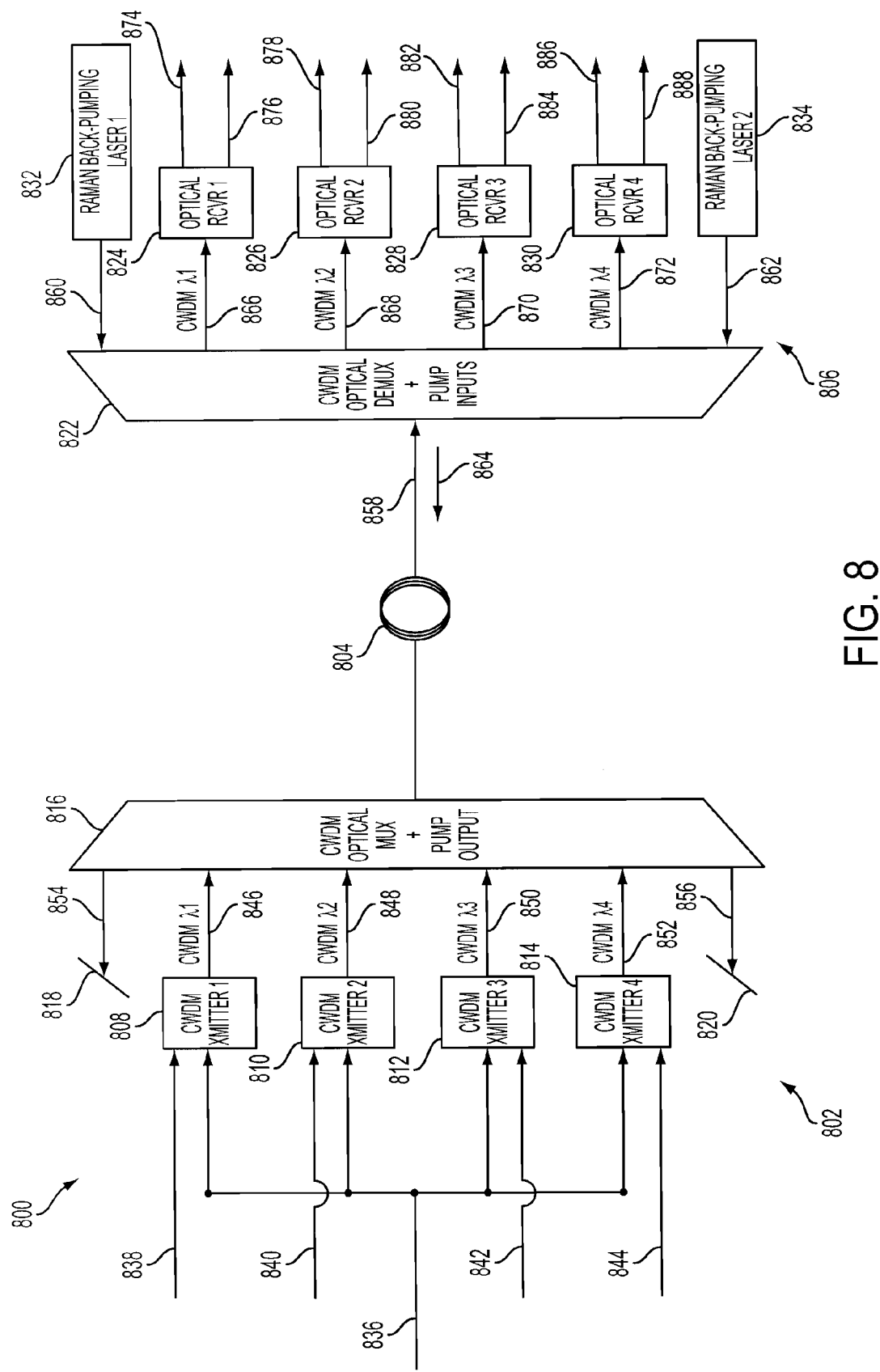
FIG. 8 illustrates a more detailed example communication system in accordance with an aspect of the present invention.

FIG. 8 shows a simplified block diagram of a CWDM transmission arrangement 800 in accordance with an aspect of the present invention.

As illustrated in the figure, CWDM transmission arrangement 800 includes a transmission side 802, a length of optical fiber 804 and a receiver side 806. Transmission side 802 is operable to transmit signals along optical fiber 804 to receiver side 806. Receiver side 806 is operable to provide a Ramon back-pumping signal into optical fiber 804 in a direction toward transmission side 802.

Transmission side 802 includes CWDM transmitters 808, 810, 812 and 814 and a pumping wavelength division multiplexer 816. A split broadcast signal 836 is provided to each of CWDM transmitters 808, 810, 812 and 814. Each of CWDM transmitters 808, 810, 812 and 814 are additionally arranged to receive a respective narrow-cast modulation signal 838, 840, 842 and 844. CWDM transmitter 808 is operable to be modulated by broadcast signal 836 and narrow-cast signal 838 and to output a CWDM signal 846 having a wavelength $\lambda_1$. CWDM transmitter 810 is operable to be modulated by broadcast signal 836 and narrow-cast signal 840 and to output a CWDM signal 848 having a wavelength $\lambda_2$. CWDM transmitter 812 is operable to be modulated by broadcast signal 836 and narrow-cast signal 842 and to output a CWDM signal 850 having a wavelength $\lambda_3$. CWDM transmitter 814 is operable to be modulated by broadcast signal 836 and narrow-cast signal 844 and to output a CWDM signal 852 having a wavelength $\lambda_4$.

Wavelength division multiplexer 816 is operable to output, at a predetermined launch power, each of CWDM signal 846, CWDM signal 848, CWDM signal 850 and CWDM signal 852 into optical fiber 804 in a direction toward receiver side 806. Wavelength division multiplexer 816 is additionally operable to output any unused portions of pumping signals 860 and 862 via outputs 854 and 856 to optical terminators 818 and 820, respectively. In particular, the optical power of back-pumping lasers, as will be described below, is of sufficient power to transmit through the length of optical fiber 804. The unused portions of pumping signals 860 and 862 are output to output to optical terminators 818 and 820.

Receiver side 806 includes a wavelength division demultiplexer 822, CWDM receivers 824, 826, 828 and 830 and Raman back-pumping lasers 832 and 834.

Wavelength division demultiplexer 822 is arranged to receive signal 858 from optical fiber 804. Wavelength division demultiplexer 822 is operable to output CWDM signals 866, 868, 870 and 872 to CWDM receivers 824, 826, 828 and 830, respectively. Wavelength division demultiplexer 822 is additionally arranged to receive a first Raman back-pumped laser signal 860, having a wavelength band $\Delta_1$, from Raman back-pumping laser 832 and to receive a second Raman back-pumped laser signal 862, having a wavelength band $\Delta_2$, from Raman back-pumping laser 834. Wavelength division demultiplexer 822 is additionally operable to back-pump first Raman back-pumped laser signal 860 and second Raman back-pumped laser signal 862 into optical fiber 804 in a direction indicated by arrow 864 toward transmission side 802.

Signal 858 includes CWDM signal 846, CWDM signal 848, CWDM signal 850 and CWDM signal 852. Wavelength division demultiplexer 822 is operable to output CWDM signal 866, based on CWDM signal 846, having a wavelength $\lambda_1$ to CWDM receiver 824. Wavelength division demultiplexer 822 is operable to output CWDM signal 868, based on CWDM signal 848, having a wavelength $\lambda_2$ to CWDM receiver 826. Wavelength division demultiplexer 822 is operable to output CWDM signal 870, based on CWDM signal 850, having a wavelength $\lambda_3$ to CWDM receiver 828. Wavelength division demultiplexer 822 is operable to output CWDM signal 872, based on CWDM signal 852, having a wavelength $\lambda_4$ to CWDM receiver 830.

CWDM receiver 824 is operable to demodulate CWDM signal 866 and to output a broadcast signal 874 and a narrowcast signal 876. CWDM receiver 826 is operable to demodulate CWDM signal 868 and to output a broadcast signal 878 and a narrowcast signal 880. CWDM receiver 828 is operable to demodulate CWDM signal 870 and to output a broadcast signal 882 and a narrowcast signal 884. CWDM receiver 830 is operable to demodulate CWDM signal 872 and to output a broadcast signal 886 and a narrowcast signal 888. Each of broadcast signals 874, 878, 882 and 886 correspond to broadcast signal 836. Similarly, narrowcast signals 876, 880, 884 and 888 correspond to narrowcast signals 838, 840, 842 and 844 respectively. An example of information on broadcast signal 836 may include a plurality of television channels, wherein each receiver will have access to the television channels. An example of information on one of the narrowcast signals may include information specific to a particular receiver.

An example method of communicating with CWDM transmission arrangement 800 in accordance with an aspect of the present invention will now be described.

In this example, presume that optical fiber 804 is approximately 20 km in length and has a transmission power limit equal to line 416 of FIG. 5B, wherein co-propagating signals having power higher than the transmission power limit as indicated by dotted line 416 will have unacceptable CNR ratios when received by any of CWDM receivers 824, 826, 828 and 830 (via wavelength division demultiplexer 822). Further, presume that wavelength division multiplexer 816 is operable to launch a signal up to a maximum power equal to line 414 of FIG. 5B. Further, presume that each of CWDM receivers 824, 826, 828 and 830 has a reception power threshold equal to line 418 of FIG. 5B. Still further, presume that Raman back-pumping laser 832 is selected such that wavelength band $\Delta_1$ is operable to reduce Raman interactions between co-propagating signals 846 and 848 within optical fiber 804 in accordance with an aspect of the present as discussed above. Finally, presume that Raman back-pumping laser 834 is selected such that wavelength band $\Delta_2$ is operable to reduce Raman interactions between co-propagating signals 850 and 852 within optical fiber 804 in accordance with an aspect of the present as discussed above.

Figure 4B:
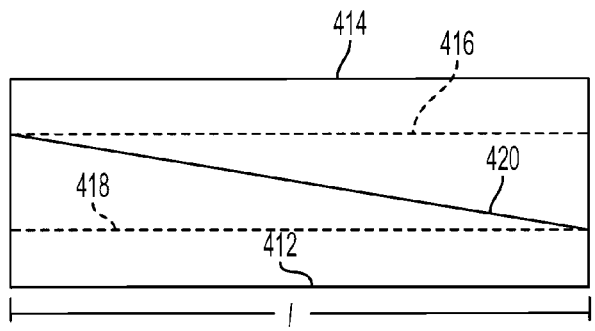
FIG. 4B is a graphical representation of light transmission through an optical fiber in the conventional communication system of FIG. 4A.

In operation, split broadcast signal 836 modulates CWDM transmitters 808, 810, 812 and 814 and their respective output signals are multiplexed onto the fiber via wavelength division multiplexer 816. Each of CWDM transmitters 808, 810, 812 and 814 is able to launch a signal up to a maximum power equal to line 414 of FIG. 5B, and will not launch a signal having a power higher than the transmission power limit as indicated by dotted line 416. In such a case, as discussed above, any co-propagating signals launched with such a power will have unacceptable CNR ratios when received by any of CWDM receivers 824, 826, 828 and 830 (via wavelength division demultiplexer 822). In accordance with an aspect of the present invention, each of CWDM transmitters 808, 810, 812 and 814 would not even need to launch a signal with a power that is just below the maximum power equal to line 414 of FIG. 5B, as is the case in the prior art system discussed above with reference to FIGS. 4A and 4B. In accordance with an aspect of the present invention, each of CWDM transmitters 808, 810, 812 and 814 may launch a signal with a power that is much less than the maximum power equal to line 414 of FIG. 5A, as is the case in the prior art system discussed above with reference to FIGS. 4A and 4B. In this example, presume that each of CWDM transmitters 808, 810, 812 and 814 launches a signal with a power equal to the reception power threshold, i.e., line 418.

Because each of CWDM transmitters 808, 810, 812 and 814 is able to launch a signal having a power lower than the transmission power limit as indicated by dotted line 416, co-propagating signals 846, 848, 850 and 852 will have acceptable CNR ratios when received by respective CWDM receivers 824, 826, 828 and 830 (via wavelength division demultiplexer 822). Further, because each of CWDM transmitters 808, 810, 812 and 814 is able to launch a signal having a power lower that is much less than the maximum power equal to line 414 of FIG. 5A, transmission side 802 is able to operable more efficiently than a transmission side of a prior art system discussed above with reference to FIGS. 4A and 4B.

In accordance with an aspect of the present invention, each of CWDM transmitters 808, 810, 812 and 814 is able to launch a signal having a power equal to the reception power threshold, i.e., line 418, as a result of Raman back-pumped laser signal 860 and Raman back-pumped laser signal 862.

In the embodiment discussed above with respect to FIG. 8, CWDM transmission arrangement 800 is operable to transmit four distinct optical signals. Of course other embodiments in accordance with an aspect of the present invention may be operable to transmit any desired number of distinct optical signals.

In the embodiment discussed above with respect to FIG. 8, CWDM transmission arrangement 800 includes two Raman back-pumping lasers. Of course other embodiments in accordance with an aspect of the present invention may include any desired number of Raman back-pumping laser, wherein each Raman back-pumping laser may be operable to output a laser having wavelength band that is operable to reduce Raman interactions between at least two co-propagating signals.

The physics involved in accordance with aspects of the present invention will now be described in more detail below.

In addition to the generation of unwanted crosstalk the stimulated Raman scattering (SRS) process can also lead to the generation of Raman-induced CSO and CTB distortions. These distortions occur as result of the nonlinear nature of the Raman amplification process which, in the undepleted regime, is exponential in form. Suppose there are two optical waves at wavelengths $\lambda_s$ (the signal wavelength) and $\lambda_p$ (the pump wavelength) propagating through a fiber of length L with a corresponding Raman gain coefficient $G_{sp}$. If at the transmitter site the instantaneous optical power associated with $\lambda_p$ is $P_p(t)$ and the instantaneous optical power associated with $\lambda_s$ is $P_s(t)$ then, in the undepleted power regime, the optical power at the wavelength $\lambda_s$ at position L due to the Raman scattering is given by:

$$P_s(t,L) = P_s(t)e^{[G_{sp}\bar{\rho}_L L_{eff} P_p(t) - \alpha L]} \quad \text{if } \lambda_p < \lambda_s \tag{1a}$$

or $$P_s(t,L) = P_s(t)e^{\left[-G_{sp}\bar{\rho}_L L_{eff} \frac{\tilde{n}_p \lambda_p}{\tilde{n}_s \lambda_s} P_p(t) - \alpha L\right]} \quad \text{if } \lambda_s < \lambda_p \tag{1b}$$

Here $L_{eff}$ is the effective length in the fiber at the pump wavelength, $\alpha$ is the power attenuation factor in the fiber at the signal wavelength, $\bar{\rho}_L$ is the running average probability of finding the two signals in the same state of polarization, $\tilde{n}_p$ and $\tilde{n}_s$ are the indices of refraction at the respective wavelengths. By defining a simple function $H_{s,p}$:

$$H_{s,p} \equiv \begin{cases} 1 & \lambda_s > \lambda_p \\ -1 \frac{\tilde{n}_p \lambda_p}{\tilde{n}_s \lambda_s} & \lambda_s < \lambda_p \end{cases} \tag{2}$$

Then (1a) and (1b) can be combined into a single equation:

$$P_s(t,L) = P_s(t)e^{[H_{sp} G_{sp} \bar{\rho}_L L_{eff} P_p(t) - \alpha L]} \tag{3}$$

This will come in handy when addressing a multi-wavelength optical communication system.

Expanding the exponential in equation (1a) gives:

$$\begin{aligned} P_s(t,L) &= P_s(t)\left[1 + G_{sp}\bar{\rho}_L L_{eff} P_p(t) + \frac{(G_{sp}\bar{\rho}_L L_{eff})^2}{2}(P_p(t))^2 + \ldots\right]e^{-\alpha L} \\ &= \left[P_s(t) + G_{sp}\bar{\rho}_L L_{eff} P_s(t) P_p(t) + \frac{(G_{sp}\bar{\rho}_L L_{eff})^2}{2} P_s(t)(P_p(t))^2 + \ldots\right]e^{-\alpha L} \end{aligned} \tag{4}$$

The second line of equation (4) provides the sought after explanation to the Raman-induced crosstalk, CSO, and CTB distortions in the near-zero dispersion optical communication system when the time dependent pump and signal wave powers are represented by:

$$P_s(t) = P_{0s} + P_{ms}(t) \qquad (5a)$$
$$= P_{0s} + P_{0s}m_s f_s(t) + CSO_s + CTB_s$$

$$P_p(t) = P_{0p} + P_{mp}(t) \qquad (5b)$$
$$= P_{0p} + P_{0p}m_p f_p(t) + CSO_p + CTB_p$$

Here $P_{0s}, P_{0p}$ are the average optical powers of the signal and pump waves, $P_{ms}(t)$, $P_{mp}(t)$ represent the explicitly time dependent terms of the optical powers, and $m_s$, $m_p$ are the respective optical modulation indices (OMI) for each laser. The third and fourth terms of the second lines in equations (5a) and (5b) represent the composite second order ($CSO_s$, $CSO_p$) and composite triple beat ($CTB_s$, $CTB_p$) distortions generated within the signal and pump optical transmitters themselves. The $CSO_s$ and $CSO_p$ distortions are native to the transmitters and are independent of the Raman interactions taking place in the fiber. The time dependent modulating functions $f_s(t)$ and $f_p(t)$ represented the information being carried on each optical wave. After substituting equations (5a) and (5b) into equation (4) and retaining only the most dominant terms one obtains:

$$P_s(t, L) = \qquad (7)$$
$$P_{0s}[1 + G_{sp}\bar{\rho}_L L_{eff} P_{0p}]e^{-\alpha L} + P_{0s}m_s f_s(t)[1 + G_{sp}\bar{\rho}_L L_{eff} P_{0p}]e^{-\alpha L} +$$
$$G_{sp}\bar{\rho}_L L_{eff} P_{0s}(P_{0p}m_p f_p(t))e^{-\alpha L} + CSO_s[1 + G_{sp}\bar{\rho}_L L_{eff} P_{0p}]e^{-\alpha L} +$$
$$G_{sp}\bar{\rho}_L L_{eff} P_{0s} CSO_p e^{-\alpha L} G_{sp}\bar{\rho}_L L_{eff}[P_{0s}m_s f_s(t)][P_{0p}m_p f_p(t)]e^{-\alpha L} +$$
$$CTB_s[1 + G_{sp}\bar{\rho}_L L_{eff} P_{0p}]e^{-\alpha L} + G_{sp}\bar{\rho}_L L_{eff} P_{0s} CTB_p e^{-\alpha L} +$$
$$\frac{(G_{sp}\bar{\rho}_L L_{eff})^2}{2}[P_{0s}m_s f_s(t)][P_{0p}m_p f_p(t)]^2 e^{-\alpha L}$$

The second line of equation (7) contains the undistorted signal transmitter's RF subcarrier modulation multiplied by the Raman gain term $(1+G_{sp}\bar{\rho}_L L_{eff} P_{0p})$ and an additional first order RF subcarrier term arising from the modulated pump laser. This additional first order term is RF subcarrier crosstalk, a direct transfer of the pump laser's RF subcarrier modulation $(P_{0p}m_p f_p(t))$ to the signal carrier scaled by the Raman factor $G_{sp}\bar{\rho}_L L_{eff} P_{0s}$. When the RF subcarrier crosstalk is exactly in phase the signals constructively add (plus sign) while if they are exactly out of phase they destructively interfere (minus sign), all other phasing possibilities fall between these two extremes. The first terms of the third and fourth lines are the signal laser's generated $CSO_s$ and $CTB_s$ terms each multiplied by the same Raman gain term as the signal laser's RF subcarrier modulation. The second terms of the third and fourth lines are respectively the direct transfer of the pump laser's $CSO_p$ and $CTB_p$ distortions (distortion crosstalk) to the signal wave scaled by the same Raman factor as the RF subcarrier crosstalk that is transferred from the pump wave to the signal wave. The third terms of the third and fourth lines are the new Raman generated $CSO_R$ and $CTB_R$ distortions resulting from the product of the signal and pump lasers' RF subcarrier modulations. Collectively, the RF subcarrier crosstalk term, along with the second and third terms of the third and fourth lines constitute degraded performance of the signal transmitter due to the Raman interactions between the modulated pump and signal lasers. These will be denoted collectively as the Raman-induced distortions. If the pump and signal lasers' modulations are not in phase with one another destructive interference can also result between the various terms within each line of equation (7). It is the purpose of this invention to elucidate the method and apparatus utilizing destructive interference to reduce the deleterious effects of the Raman-induced RF subcarrier crosstalk and CSO distortion terms.

Taking the ratio of the second term of the second line in (7) to the first term in the second line gives the Raman crosstalk ratio:

$$Xtalk = \frac{G_{sp}\bar{\rho}_L L_{eff} P_{0s}(P_{0p}m_p f_p(t))}{P_{0s}m_s f_s(t)[1 + G_{sp}\bar{\rho}_L L_{eff} P_{0p}]} \qquad (8)$$
$$\approx \frac{f_p(t)}{f_s(t)} \frac{m_p}{m_s} G_{sp}\bar{\rho}_L L_{eff} P_{0p}$$

Assuming identical modulation on the signal and pump lasers then gives:

$$Xtalk \approx \frac{m_p}{m_s} G_{sp}\bar{\rho}_L L_{eff} P_{0p} \qquad (9)$$

In electrical units the crosstalk ratio is given by the square of Xtalk:

$$Xtalk_{electrical} = \left(\frac{m_p}{m_s} G_{sp}\bar{\rho}_L L_{eff} P_{0p}\right)^2 \qquad (10)$$

Similarly the ratio of the Raman CSO term to the signal term is:

$$CSO_{Ram} = \frac{G_{sp}\bar{\rho}_L L_{eff}\lfloor P_{0s}m_s f_s(t)\rfloor\lfloor P_{0p}m_p f_p(t)\rfloor}{P_{0s}m_s f_s(t)[1 + G_{sp}\bar{\rho}_L L_{eff} P_{0p}]} \qquad (11)$$
$$\approx \frac{f_s(t)f_p(t)}{f_s(t)} m_p G_{sp}\bar{\rho}_L L_{eff} P_{0p}$$

In the frequency domain we need to take the Fourier transforms of the time dependent modulation signals:

$$CSO_{Ram} \approx \frac{\Im[f_s(t)f_p(t)]}{\Im[f_s(t)]} m_p G_{sp}\bar{\rho}_L L_{eff} P_{0p} \qquad (12)$$

Then the Raman CSO ratio in electrical units is the square of this ratio:

$$CSO_{Ram}^{electrical} = \left(\frac{\Im[f_s(t)f_p(t)]}{\Im[f_s(t)]} m_p G_{sp}\bar{\rho}_L L_{eff} P_{0p}\right)^2 \qquad (13)$$
$$= \left(\frac{\Im[f_s(t)f_p(t)]}{\Im[f_s(t)]}\right)^2 (m_s)^2 Xtalk_{electrical}$$

The ratio of the Raman CTB term to the signal term is:

$$CTB_{Ram} = \frac{\frac{(G_{sp}\bar{\rho}_L L_{eff})^2}{2}[P_{0s}m_s f_s(t)][P_{0p}m_p f_p(t)]^2}{P_{0s}m_s f_s(t)[1 + G_{sp}\bar{\rho}_L L_{eff} P_{0p}]} \qquad (14)$$

$$\approx \frac{1}{2} \frac{f_s(t)(f_p(t))^2}{f_s(t)} [m_p G_{sp} \bar{\rho}_L L_{eff} P_{0p}]^2$$

In the frequency domain we need to take the Fourier transforms of the time dependent modulation signals:

$$CTB_{Ram} = \frac{1}{2} \frac{\Im[f_s(t)(f_p(t))^2]}{\Im[f_s(t)]} [m_p G_{sp} \bar{\rho}_L L_{eff} P_{0p}]^2 \quad (15)$$

Then the Raman CTB ratio in electrical units is the square of this ratio:

$$CTB_{Ram}^{electrical} = \frac{1}{4} \left( \frac{\Im[f_s(t)(f_p(t))^2]}{\Im[f_s(t)]} \right)^2 (m_p G_{sp} \bar{\rho}_L L_{eff} P_{0p})^4 \quad (16)$$

$$= \frac{1}{4} \left( \frac{\Im[f_s(t)(f_p(t))^2]}{\Im[f_s(t)]} \right)^2 (m_s)^4 (Xtalk_{electrical})^2$$

Now suppose the system is back-pumped with a Raman pumping source the provides a gain of $\Gamma = \exp(G_{sP} \bar{\rho}_L L'_{eff})$ where $G_{sP}$ is the Raman gain between the signal and the unmodulated back-pumping laser P, $L'_{eff}$ is the effective length of the back-pumping laser, and $\bar{\rho}_L$ is the length averaged polarization overlap factor between the back-pumping laser and the modulated signal laser. Assuming that each of the co-propagating modulated lasers p and s each experience approximately the same gain value $\Gamma$ due to the back-pumping effect then their initial launch powers, $P_{0s}$, and $P_{0p}$, may each correspondingly be reduced by the factor $\Gamma$ while still maintaining the same receiver power. Essentially equation (7) then becomes with Raman back-pumping:

$$P_s(t,L) = \frac{P_{0s}}{\Gamma} \left[ 1 + G_{sp} \bar{\rho}_L L_{eff} \frac{P_{0p}}{\Gamma} \right] e^{-\alpha L} \Gamma + \quad (17)$$

$$\frac{P_{0s}}{\Gamma} m_s f_s(t) \left[ 1 + G_{sp} \bar{\rho}_L L_{eff} \frac{P_{0p}}{\Gamma} \right] e^{-\alpha L} \Gamma +$$

$$G_{sp} \bar{\rho}_L L_{eff} \frac{P_{0s}}{\Gamma} \left( \frac{P_{0p}}{\Gamma} m_p f_p(t) \right) e^{-\alpha L} \Gamma +$$

$$CSO_s \left[ 1 + G_{sp} \bar{\rho}_L L_{eff} \frac{P_{0p}}{\Gamma} \right] e^{-\alpha L} \Gamma + G_{sp} \bar{\rho}_L L_{eff} \frac{P_{0s}}{\Gamma} CSO_p e^{-\alpha L} \Gamma +$$

$$G_{sp} \bar{\rho}_L L_{eff} \left[ \frac{P_{0s}}{\Gamma} m_s f_s(t) \right] \left[ \frac{P_{0p}}{\Gamma} m_p f_p(t) \right] e^{-\alpha L} \Gamma +$$

$$CTB_s \left[ 1 + G_{sp} \bar{\rho}_L L_{eff} \frac{P_{0p}}{\Gamma} \right] e^{-\alpha L} \Gamma + G_{sp} \bar{\rho}_L L_{eff} \frac{P_{0s}}{\Gamma} CTB_p e^{-\alpha L} \Gamma +$$

$$\frac{(G_{sp} \bar{\rho}_L L_{eff})^2}{2} \left[ \frac{P_{0s}}{\Gamma} m_s f_s(t) \right] \left[ \frac{P_{0p}}{\Gamma} m_p f_p(t) \right]^2 e^{-\alpha L} \Gamma$$

Referring to equation (17) the relevant crosstalk and distortion ratios become with Raman back-pumping:

$$Xtalk' \approx \frac{m_p}{m_s} G_{sp} \bar{\rho}_L L_{eff} \frac{P_{0p}}{\Gamma} \quad (18)$$

$$Xtalk'_{e;lectrical} = \left( \frac{m_p}{m_s} G_{sp} \bar{\rho}_L L_{eff} \frac{P_{0p}}{\Gamma} \right)^2 \quad (19)$$

$$CSO'_{Ram} \approx \frac{\Im[f_s(t) f_p(t)]}{\Im[f_s(t)]} m_p G_{sp} \bar{\rho}_L L_{eff} \frac{P_{0p}}{\Gamma} \quad (20)$$

$$CSO'^{electrical}_{Ram} = \left( \frac{\Im[f_s(t) f_p(t)]}{\Im[f_s(t)]} m_p G_{sp} \bar{\rho}_L L_{eff} \left( \frac{P_{0p}}{\Gamma} \right) \right)^2 \quad (21)$$

$$= \left( \frac{\Im[f_s(t) f_p(t)]}{\Im[f_s(t)]} \right)^2 (m_s)^2 Xtalk'_{electrical}$$

$$CTB'_{Ram} = \frac{1}{2} \frac{\Im[f_s(t)(f_p(t))^2]}{\Im[f_s(t)]} \left[ m_p G_{sp} \bar{\rho}_L L_{eff} \frac{P_{0p}}{\Gamma} \right]^2 \quad (22)$$

$$CTB'^{electrical}_{Ram} = \frac{1}{4} \left( \frac{\Im[f_s(t)(f_p(t))^2]}{\Im[f_s(t)]} \right)^2 \left( m_p G_{sp} \bar{\rho}_L L_{eff} \frac{P_{0p}}{\Gamma} \right)^4 \quad (23)$$

$$= \frac{1}{4} \left( \frac{\Im[f_s(t)(f_p(t))^2]}{\Im[f_s(t)]} \right)^2 (m_s)^4 (Xtalk'_{electrical})^2$$

Clearly we observe that with Raman back-pumping, in the optical domain, that both the crosstalk and Raman CSO ratios are each reduced by a factor of $\Gamma$ as compared to the case without back-pumping. In the electrical domain the reduction factor is $\Gamma^2$. For the Raman CTB the reduction is even more dramatic, a factor of $\Gamma^2$ in the optical domain and $\Gamma^4$ in the electrical domain.

Thus the simple rule of thumb is that if a system is in place whereby Raman back-pumping is utilized such that the optical gain provided to the co-propagating signals by the back-pumping laser is given by $\Gamma$ (or in dB 10 log($\Gamma$)) and correspondingly the launch powers of the co-propagating signals are each reduced by a factor of $\Gamma$ (as compared to the case without back-pumping) then both the Raman crosstalk and Raman CSO (both measured in electrical units) are each reduced (i.e., improved) by a factor of exactly $\Gamma^2$ (or in dB 20 log($\Gamma$)) and the Raman-induced CTB is reduced by a factor of $\Gamma^4$ (or in dB 40 log($\lambda$)) in electrical units.

When there are three or more lasers in the system, equation (7) must be modified to account for the multiple optical signals. For a system with n transmitters, equation (7) becomes:

$$P_i(t,L) = P_{0i} \left( 1 + L_{eff} \sum_{j=1}^{n} H_{i,j} G_{i,j} \bar{\rho}_{Li,j} P_{0j} \right) \quad (24a)$$

$$e^{-\alpha L} + \begin{bmatrix} P_{0i} m_i f_i(t) \left( 1 + L_{eff} \sum_{j=1}^{n} H_{i,j} G_{i,j} \bar{\rho}_{Li,j} P_{0j} \right) + \\ P_{0i} L_{eff} \sum_{j=1}^{n} H_{i,j} P_{0j} m_j f_j(t) G_{i,j} \bar{\rho}_{Li,j} \end{bmatrix}$$

$$e^{-\alpha L} \begin{bmatrix} CSO_i \left( 1 + L_{eff} \sum_{j=1}^{n} H_{i,j} G_{i,j} \bar{\rho}_{Li,j} P_{0j} \right) + \\ P_{0i} L_{eff} \sum_{j=1}^{n} H_{i,j} G_{i,j} \bar{\rho}_{Li,j} CSO_j + P_{0i} m_i f_i(t) \\ L_{eff} \sum_{j=1}^{n} H_{i,j} G_{i,j} \bar{\rho}_{Li,j} P_{0j} m_j f_j(t) \end{bmatrix}$$

$$e^{-\alpha L}\begin{bmatrix} CTB_i\left(1+L_{eff}\sum_{j=1}^n H_{i,j}G_{i,j}\bar{\rho}_{Li,j}P_{0j}\right)+ \\ P_{0i}L_{eff}\sum_{j=1}^n H_{i,j}G_{i,j}\bar{\rho}_{Li,j}CTB_j+ \\ P_{0i}m_if_i(t)\frac{(L_{eff})^2}{2}\left[\sum_{j=1}^n H_{i,j}G_{i,j}\bar{\rho}_{Li,j}P_{0j}m_jf_j(t)\right]^2 \end{bmatrix}e^{-\alpha L}$$

If Raman back-pumping is implemented providing an average signal gain of $\Gamma$ to each of the co-propagating signals so that the launch powers of each signal can, on average, be reduced by a factor of $\Gamma$ while still maintaining the same receiver power then equation (24a) becomes:

$$P_i(t,L)=\frac{P_{0i}}{\Gamma}\left(1+L_{eff}\sum_{j=1}^n H_{i,j}G_{i,j}\bar{\rho}_{Li,j}\frac{P_{0j}}{\Gamma}\right) \quad (24b)$$

$$e^{-\alpha L}\Gamma+\begin{bmatrix}\frac{P_{0i}}{\Gamma}m_if_i(t)\left(1+L_{eff}\sum_{j=1}^n H_{i,j}G_{i,j}\bar{\rho}_{Li,j}\frac{P_{0j}}{\Gamma}\right)+\\ \frac{P_{0i}}{\Gamma}L_{eff}\sum_{j=1}^n H_{i,j}\frac{P_{0j}}{\Gamma}m_jf_j(t)G_{i,j}\bar{\rho}_{Li,j}\end{bmatrix}$$

$$e^{-\alpha L}\Gamma\begin{bmatrix}CSO_i\left(1+L_{eff}\sum_{j=1}^n H_{i,j}G_{i,j}\bar{\rho}_{Li,j}\frac{P_{0j}}{\Gamma}\right)+\\ \frac{P_{0i}}{\Gamma}L_{eff}\sum_{j=1}^n H_{i,j}G_{i,j}\bar{\rho}_{Li,j}CSO_j+\frac{P_{0i}}{\Gamma}m_if_i(t)\\ L_{eff}\sum_{j=1}^n H_{i,j}G_{i,j}\bar{\rho}_{Li,j}\frac{P_{0j}}{\Gamma}m_jf_j(t)\end{bmatrix}e^{-\alpha L}$$

$$\Gamma\begin{bmatrix}CTB_i\left(1+L_{eff}\sum_{j=1}^n H_{i,j}G_{i,j}\bar{\rho}_{Li,j}\frac{P_{0j}}{\Gamma}\right)+\\ \frac{P_{0i}}{\Gamma}L_{eff}\sum_{j=1}^n H_{i,j}G_{i,j}\bar{\rho}_{Li,j}CTB_j+\frac{P_{0i}}{\Gamma}m_if_i(t)\\ \frac{(L_{eff})^2}{2}\left[\sum_{j=1}^n H_{i,j}G_{i,j}\bar{\rho}_{Li,j}\frac{P_{0j}}{\Gamma}m_jf_j(t)\right]^2\end{bmatrix}e^{-\alpha L}\Gamma$$

The summations in equations (24a) and (24b) are over the parameters of the "n" transmitters in the system. It is important to note that equations (1a) through (8) are to be interpreted as being in the optical domain. Therefore the powers in these equations, including the distortions ($CSO_s$, $CSO_p$, $CTB_s$, and $CTB_p$) are optical powers and not electrical (or RF) power levels.

Almost by inspection we can observe that the essentially the same rule-of-thumb applies (with regard to the Raman crosstalk, Raman CSO, and Raman CTB) to the multi wavelength Raman back-pumped system as in the case of the two wavelength system with back-pumping namely that:

If a system is in place whereby Raman back-pumping is utilized such that the optical gain provided to the co-propagating signals by the back-pumping laser(s) is, on average, given by $\Gamma$ (or in dB 10 log($\Gamma$)) and correspondingly the launch powers of the co-propagating signals are each reduced by a factor of $\Gamma$ (as compared to the case without back-pumping) then both the Raman crosstalk and Raman CSO (both measured in electrical units) are each reduced (i.e., improved) by a factor of exactly $\Gamma^2$ (or in dB 20 log($\Gamma$)) and the Raman-induced CTB is reduced by a factor of $\Gamma^4$ (or in dB 40 log($\Gamma$)) in electrical units.

The aspects of the present invention solve two problems. First they allow for a relatively inexpensive 1310 nm CWDM "fiber deep" system architecture to be deployed by MSO's desiring to compete with telecommunication system operators' fiber-to-the-home offerings. Secondly they solve the Raman generated CSO/CTB distortion problem inherent in a near-zero dispersion CWDM system with identically modulated co-propagating laser signals. Both of these issues may be solved by making feasible low optical power launches at the transmitter site while still maintaining the desired optical signal levels at the receiver site(s). Using a Raman back-pumped approach in accordance with aspects of the present invention, the optical launch powers are very low so the RF modulation scheme for the lasers is simplified since all of the system's transmitters can now carry the identical broadcast information without generating undue distortions. Each optical signal would also carry different narrow-cast programming to specific locations. Without this approach, one laser would have to be dedicated to broadcast information while the others would carry the narrow-cast signals. At the receiver site(s) the appropriate signals would then have to be combined and sent to the information consumers. The approach in accordance with the present invention removes the complicated signal combing at the receiver site.

The bulk of the discussion above deals with an example system wherein the optical fiber includes a material such that transmitted co-propagating signals within a specific wavelength band have zero or near-zero dispersion. In such a situation, the Raman-induced crosstalk between the co-propagating signals is maximized. As the launch power of the transmitted co-propagating signals increases, so do the Raman-induced impairments such as crosstalk and CSO, which greatly decreases the quality of the corresponding received co-propagating signals. Conventional systems, which launch signals at a maximum power to maximize a transmission link length, therefore are unable to transmit co-propagating signals within the zero or near-zero dispersion band. In accordance with the present invention, co-propagating signals within the zero or near-zero dispersion band may be transmitted, and received, because the launched signals are launched at very low power.

It should be noted that aspects of the present invention are not limited to use within a system operating in a zero or near-zero dispersion band. Although the Raman-induced impairments may not be as large a factor in a system that is not transmitting co-propagating signals within a zero or near-zero dispersion band, the overall aspect of a combination of launching at substantially lower power levels and back-pumping to provide Raman gain may be used in order to reduce the levels of the Raman impairments induced between the co-propagating signals.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for transmitting a first optical signal and a second optical signal through an optical fiber having material operable to transmit a wavelength band including a first wavelength and a second wavelength and that produces distortions in at least one of the first optical signal and the second optical signal when the at least one of the first optical signal and the second optical signal has a power that is greater than a maximum acceptable transmission power such that an output corresponding to the at least one of the first optical signal and the second optical signal has a degradation that is more than a predetermined acceptable degradation, said system comprising:
- a first optical transmitter operable to transmit the first optical signal up to a first maximum power and including the maximum acceptable transmission power, the first optical signal having the first wavelength, wherein said first optical transmitter is operable to receive a first information as at least one of a broadcast signal and a first narrowcast signal,
- further wherein the first optical signal is based on the received at least one of the broadcast signal and the first narrowcast signal,
- a second optical transmitter operable to transmit the second optical signal up to a second maximum power and including the maximum acceptable transmission power, the second optical signal having the second wavelength, wherein said second optical transmitter is operable to receive a second information as at least one of the broadcast signal and a second narrowcast signal, further wherein the second optical signal is based on the received at least one of the broadcast signal and the second narrowcast signal;
- an optical receiver being disposed to receive a received optical signal corresponding to one of the first optical signal and the second optical signal, said optical receiver being operable to process the received optical signal only when the received optical signal has a power equal to or greater than a minimum power and when a degradation of the received optical signal is less than or equal to the predetermined acceptable degradation;
- a laser portion operable to generate an amplifying signal capable of generating a Raman interaction in the optical fiber to provide a gain to the received optical signal; and
- a combiner portion operable to receive the amplifying signal and provide a back-pump signal based on the amplifying signal into the optical fiber to provide a gain to the one of the first optical signal and the second optical signal such that when said first optical transmitter transmits the first optical signal below the maximum acceptable transmission power and when said second optical transmitter transmits the second optical signal below the maximum acceptable transmission power said optical receiver is operable to process the received optical signal.

2. The system of claim 1,
wherein said first optical transmitter is operable to receive the first information as the broadcast signal and the first narrowcast signal,
wherein said second optical transmitter is operable to receive the second information as the broadcast signal and the second narrowcast signal,
wherein the first optical signal is based on the broadcast signal and the first narrowcast signal, and
wherein the second optical signal is based on the broadcast signal and the second narrowcast signal.

3. The system of claim 2, further comprising a second optical receiver disposed to receive a second received optical signal corresponding to the other of the first optical signal and the second optical signal, said second optical receiver being operable to process the received second optical signal only when the received second optical signal has a power equal to or greater than the minimum power and when a degradation of the received second optical signal is less than or equal to the predetermined acceptable degradation.

4. The system of claim 3, further comprising:
an optical demultiplexer arranged to receive the first optical signal and the second optical signal from the optical fiber, to provide the first optical signal as the first received optical signal to said first optical receiver and to provide the second optical signal as the second received optical signal to said second optical receiver,
wherein said first optical receiver is operable to generate a first received narrowcast signal and a received broadcast signal,
wherein said second optical receiver is operable to generate a second received narrowcast signal and the received broadcast signal,
wherein the first received narrowcast signal is based on the first narrowcast signal,
wherein the second received narrowcast signal is based on the second narrowcast signal, and
wherein the received broadcast signal is based on the broadcast signal.

5. The system of claim 4, wherein one of the first narrowcast signal, the second narrowcast signal and the broadcast signal comprises a wavelength of 1310 nm.

6. The system of claim 1, wherein said first optical transmitter comprises a first laser, and the second optical transmitter comprises a second laser and the combining portion comprises a multiplexer for multiplexing the first optical signal and the second optical signal.

7. A method of transmitting a first optical signal and a second optical signal through an optical fiber having material operable to transmit a near-zero dispersion wavelength band including a first wavelength and a second wavelength and that produces distortions in at least one of the first optical signal and the second optical signal when the at least one of the first optical signal and the second optical signal has a power that is greater than a maximum acceptable transmission power such that an output corresponding to the at least one of the first optical signal and the second optical signal has a degradation that is more than a predetermined acceptable degradation, said method comprising:
transmitting the first optical signal and the second optical signal into the transmission end of the length of optical fiber at a transmission power below the maximum acceptable transmission power and above a minimum transmission power, the first optical signal having the first wavelength within the near-zero dispersion wavelength band, the second optical signal having the second wavelength within the near-zero dispersion wavelength band;
wherein said transmitting the first optical signal is based on receiving a first information and generating the first optical signal based on the first information, further wherein receiving the first information comprises receiving the first information as at least one of a broadcast signal and a first narrowcast signal,
wherein said transmitting the second optical signal is based on receiving a second information and generating the second optical signal based on the second information, further wherein receiving the second information comprises receiving the second information as at least one of the broadcast signal and a second narrowcast signal;
receiving, from the optical fiber, the output signal based on the first optical signal and the second optical signal;
processing the output signal only when the output signal has a power equal to or greater than a minimum power and when the degradation is less than or equal to the predetermined acceptable degradation; and providing, into the optical fiber, an amplifying signal capable of generating a Raman interaction in the optical fiber to provide a gain to the output signal.

8. A method of transmitting a first optical signal and a second optical signal through an optical fiber having material operable to transmit a wavelength band including a first wavelength and a second wavelength and that produces distortions in at least one of the first optical signal and the second optical signal when the at least one of the first optical signal and the second optical signal has a power that is greater than a maximum acceptable transmission power such that an output corresponding to the at least one of the first optical signal and the second optical signal has a degradation that is more than a predetermined acceptable degradation, said method comprising:

transmitting the first optical signal and the second optical signal into the optical fiber at a transmission power below the maximum acceptable transmission power and above a minimum transmission power, the first optical signal having the first wavelength, the second optical signal having the second wavelength, wherein said transmitting the first optical signal is based on receiving first information and generating the first optical signal based on the first information, further wherein receiving the first information comprises receiving the first information as at least one of a broadcast signal and a first narrowcast signal, wherein said transmitting the second optical signal is based on receiving second information and generating the second optical signal based in the second information, further wherein receiving the second information comprises receiving the second information as at least one of the broadcast signal and a second narrowcast signal;

receiving, from the optical fiber, the output signal based on the first optical signal and the second optical signal;

processing the output signal only when the output signal has a power equal to or greater than a minimum power and when the degradation is less than or equal to the predetermined acceptable degradation; and providing, into optical fiber, an amplifying signal capable of generating a Raman interaction in the optical fiber to provide a gain to the output signal.

9. The method of claim 8, wherein said receiving first information and generating the first optical signal based on the first information comprises receiving the first information as the broadcast signal and the first narrowcast signal, and wherein said receiving second information and generating the second optical signal based in the second information comprises receiving the second information as the broadcast signal and the second narrowcast signal.

10. The method of claim 9, wherein said receiving, from the optical fiber, the output signal based on the first optical signal and the second optical signal comprises demultiplexing the output signal to provide a first received signal and a second received signal via a demultiplexer, generating a first received narrowcast signal and a received broadcast signal via a first receiver and generating a second received narrowcast signal and the received broadcast signal via a second receiver, wherein the first received narrowcast signal is based on the first narrowcast signal, wherein the second received narrowcast signal is based on the second narrowcast signal, and wherein the received broadcast signal is based on the broadcast signal.

11. The method of claim 10, wherein said transmitting the first optical signal and the second optical signal into the optical fiber at a transmission power below the maximum acceptable transmission power and above a minimum transmission power, the first optical signal having the first wavelength, the second optical signal having the second wavelength comprises transmitting one of the first narrowcast signal, the second narrowcast signal and the broadcast signal at a wavelength of 1310 nm.

* * * * *